INVENTOR
KURT MULLER
HEINZ TONNIGES

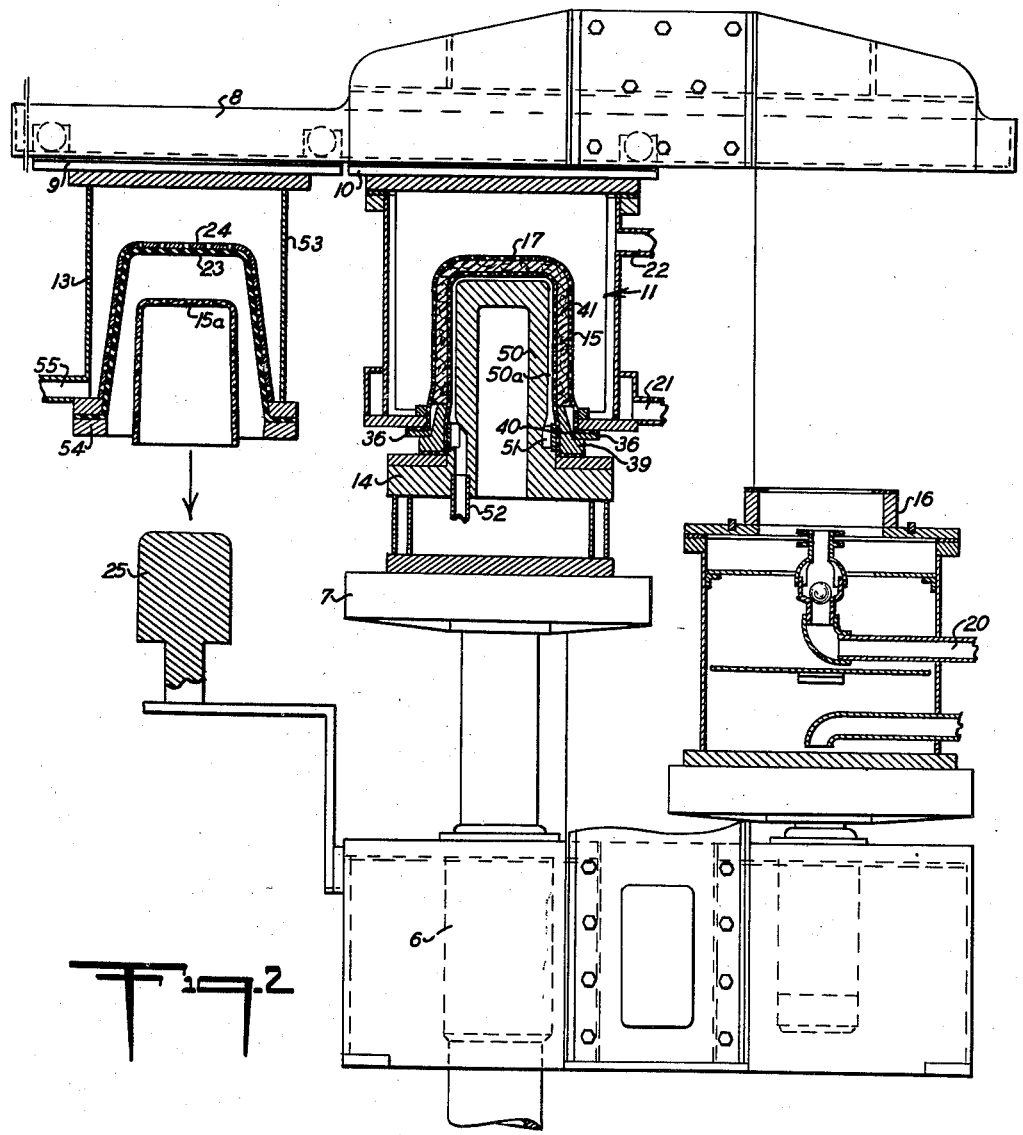

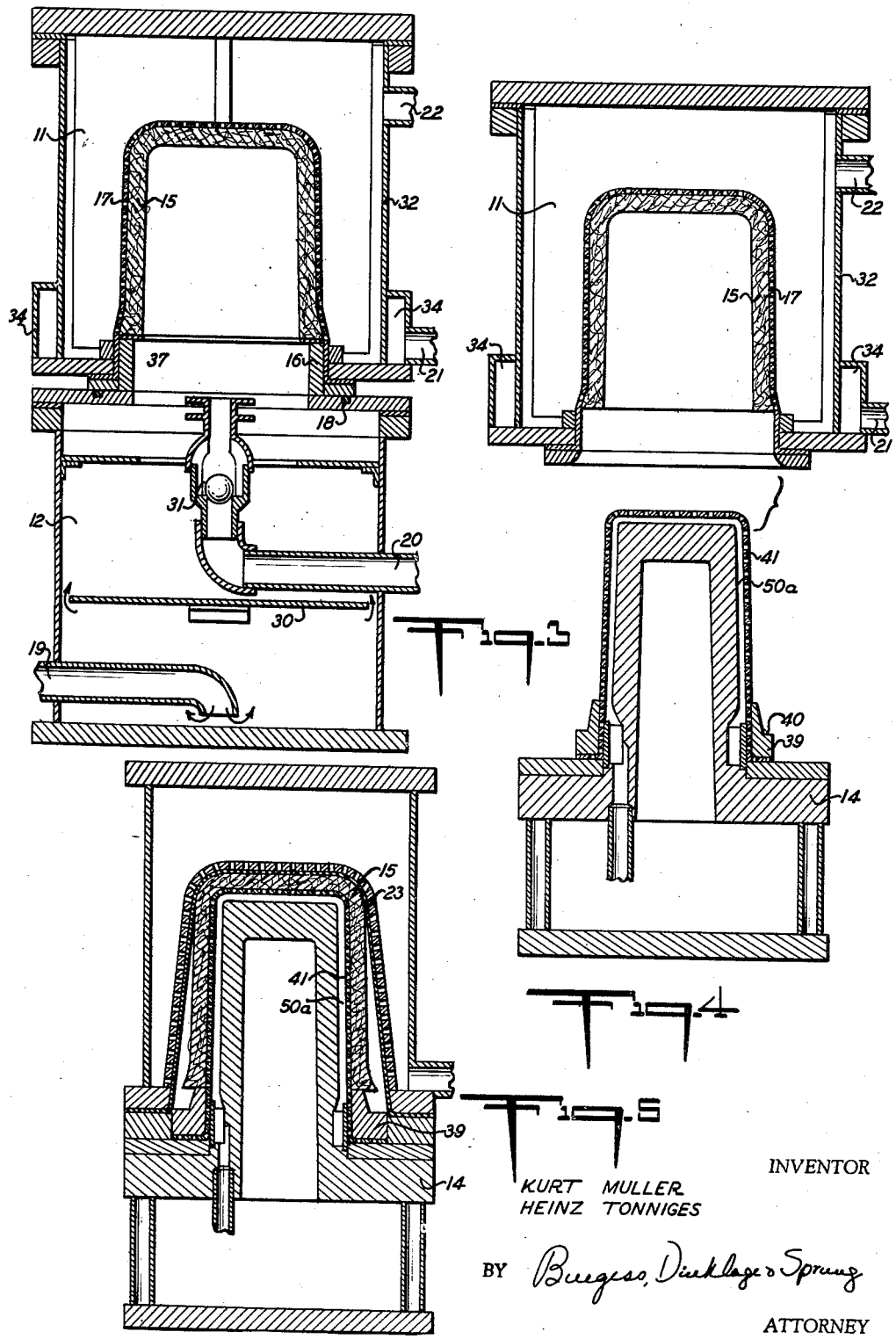

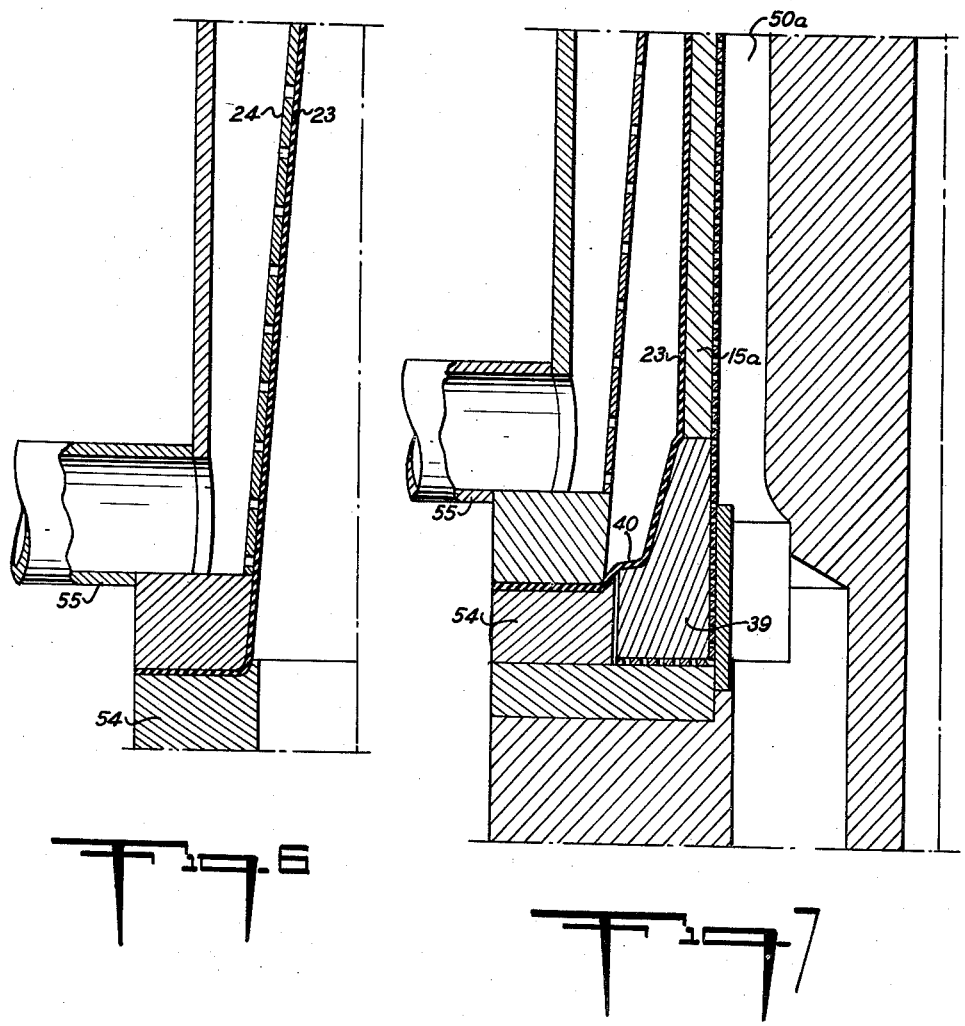

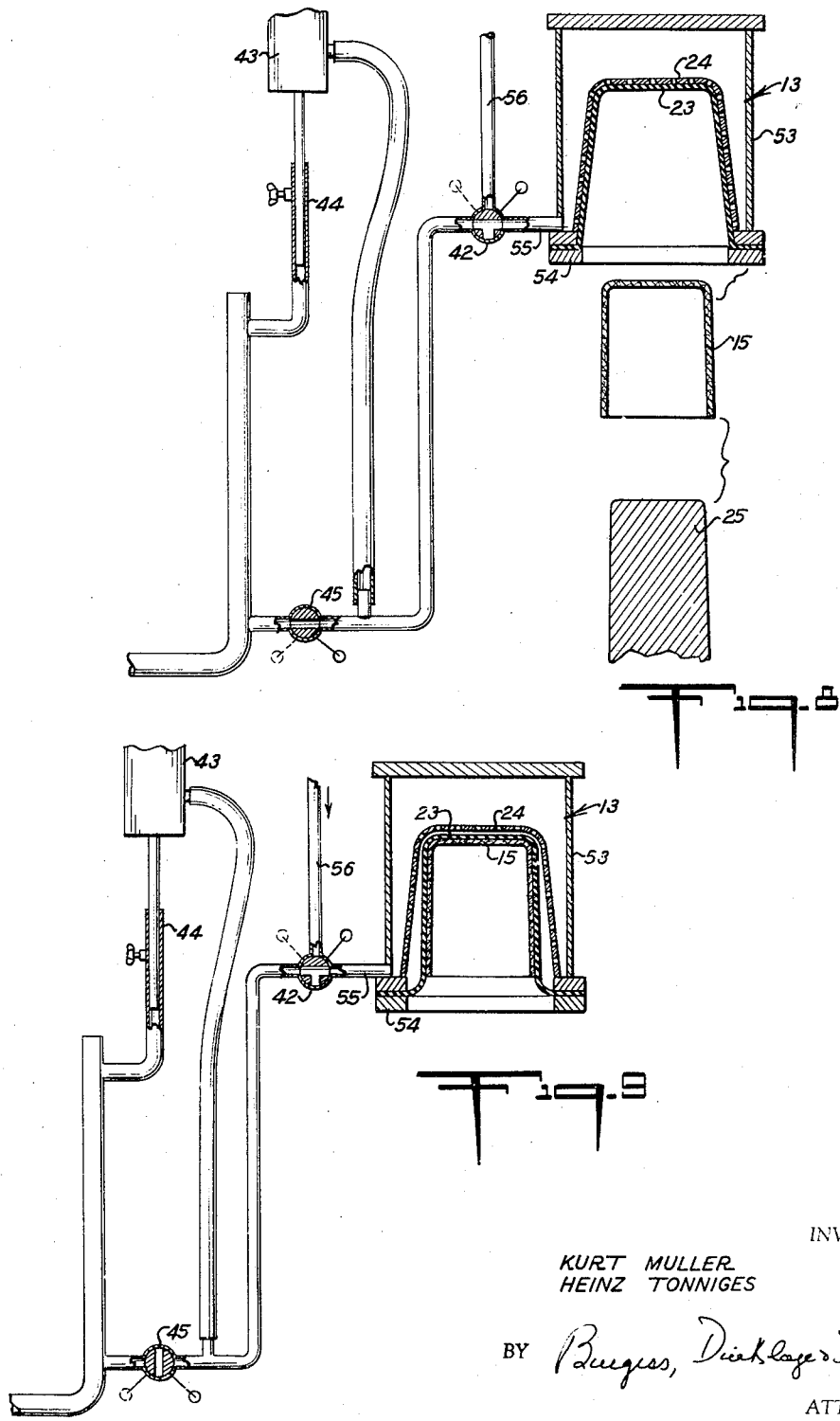

July 1, 1958
K. MULLER ET AL
2,841,054
FIBER MOLDING APPARATUS
Filed Aug. 17, 1956
7 Sheets-Sheet 6
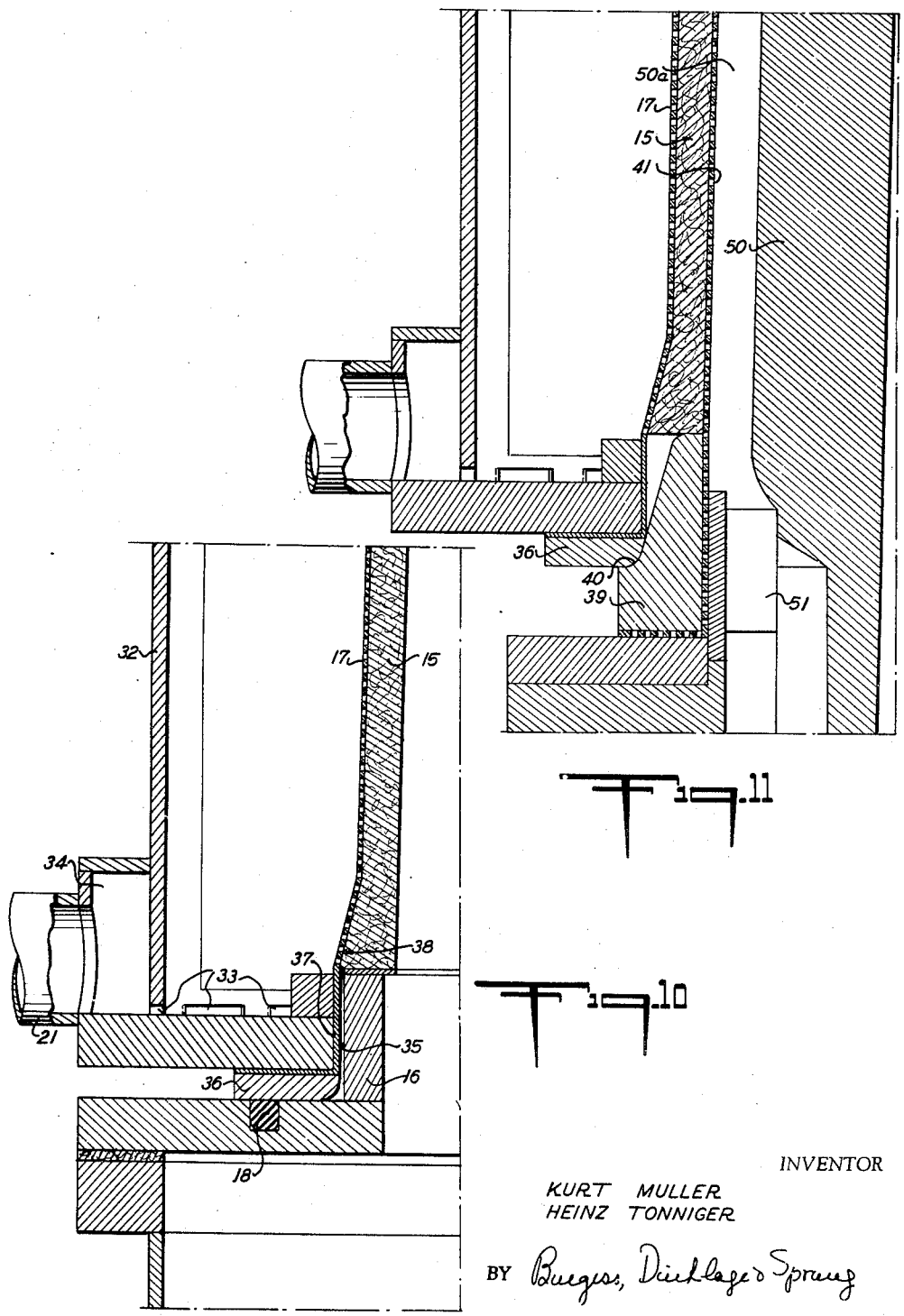
INVENTOR
KURT MULLER
HEINZ TONNIGER
BY Burgess, Dinklage & Sprung
ATTORNEY July 1, 1958

K. MULLER ET AL 2,841,054

FIBER MOLDING APPARATUS

Filed Aug. 17, 1956

INVENTOR
KURT MULLER
HEINZ TONNIGER

BY

ATTORNEY

United States Patent Office 2,841,054
Patented July 1, 1958

2,841,054

FIBER MOLDING APPARATUS

Kurt Muller and Heinz Tonniges, Krefeld, Germany, assignors to Deutsche Fibrit Gesellschaft m. b. H., Krefeld, Germany, a corporation of Germany Application August 17, 1956, Serial No. 604,779

21 Claims. (Cl. 92—54)

This invention relates to a fiber-molding apparatus. The invention more particularly relates to an apparatus for automatically manufacturing molded articles, and preferably high-grade, high-strength, hollow articles from fibrous, aqueous pulp.

The invention and its objects will become apparent from the following description, read in conjunction with the drawings, in which:

Fig. 2 is an elevation corresponding to Fig. 1 and showing the device in an operating position with the expression ram inserted into the wet mold and with the expression mold releasing the molded article ready for drying onto a receiver;

Fig. 3 is a vertical section showing the wet mold of Fig. 1 in position on the molding pot;

Fig. 4 is a vertical section showing the wet mold of Fig. 1 positioned above the expression ram;

Fig. 5 is a vertical section showing the expression ram of Fig. 1 in position within the expression mold;

Fig. 6 is a vertical section of a portion of the expression mold shown in Fig. 1, showing constructional details;

Fig. 7 is a vertical section of a portion of the expression mold and expression ram of Fig. 1 in operating position showing constructional details;

Fig. 8 is a diagrammatic vertical section showing the control arrangement for the feeding and withdrawal of fluid from the expression mold of Fig. 1 in its position releasing a molded article ready for drying;

Fig. 9 is a diagrammatic vertical section corresponding to Fig. 8, showing the expression mold in position for transporting the expressed mold;

Fig. 10 is a vertical section of a portion of the wet mold of Fig. 1 in operating position on the wet mold pot, showing constructional details;

Fig. 11 is a vertical section of a portion of the wet mold of Fig. 1 with the expression ram inserted therein, showing constructional details;

Figure 1:
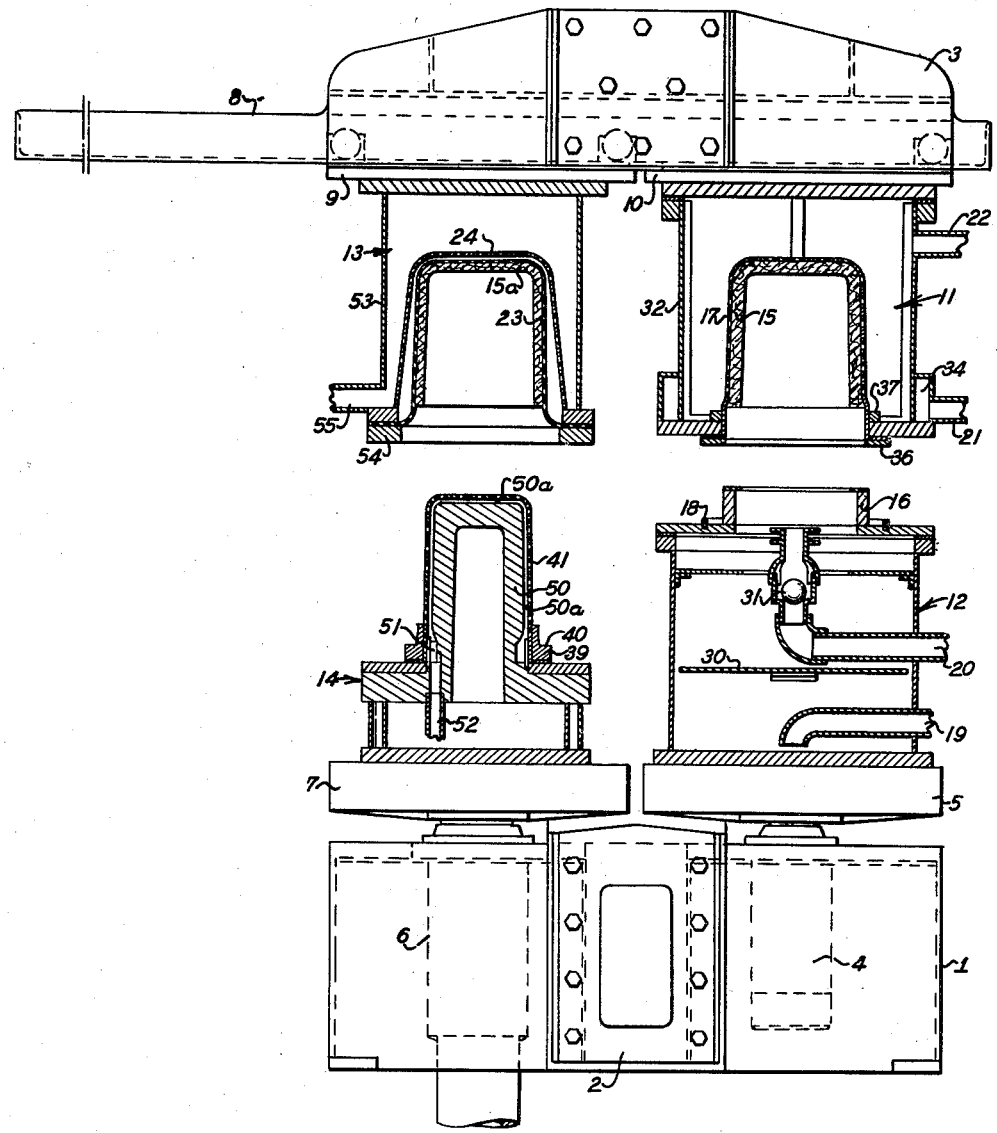
Fig. 1 is a diagrammatic side elevation partially in section, showing an embodiment of a molding apparatus in accordance with the invention in its starting position with a wet-molded article in the wet mold and a molded article ready for drying in the expression mold.

The apparaus for the automatic manufacture of molded articles from aqueous, fibrous pulp in accordance with the invention has a wet mold, which includes a female screen mold with a substantially fluid-tight chamber surrounding its outer surface, in fluid-tight engagement with the rim portion of its opening. The chamber has a fluid-exhaust conduit in communication with its interior. An expression mold is positioned in fixed spacial relationship alongside and substantially parallel to the wet mold. The expression mold includes a perforate female support form having a flexible bag lining its inner surface and a second fluid-tight chamber surrounding its outer surfacce in fluid-tight engagement with the rim portion of the opening of the flexible bag. A fluid conduit for the introduction and withdrawal of a fluid such as water is in communication with the interior of the second chamber. A wet mold pot is positioned opposite the wet mold in axial alignment therewith. This wet mold pot includes rim means which are adapted to mate in fluid-tight engagement with the rim of the female screen mold. Means are provided for passing an aqueous pulp suspension through these rim means, so that when the wet mold and pot are in engagement, the pulp suspension will deposit on the screen mold, forming a wet molded article. An expression ram is positioned opposite the expression mold in axial alignment therewith. This expression ram includes a hollow perforate male ram form which is adapted to fit within the female support form and screen mold with its walls in spaced relationship thereto. Means are provided for moving the wet mold pot and the wet mold in and out of engagement with each other and means are provided for moving the expression mold and the expression ram into and out of engagement with each other. Means are also provided for moving the expression mold out of alignment and the wet mold into alignment with the expression ram, so that the expression ram may be moved into engagement in the interior of the wet mold, and means are provided for passing fluid, such as water, through said fluid conduit into said second fluid-tight chamber.

Referring to the embodiment as shown in the drawing, 1 designates the frame of a hydraulic press, to which there is rigidly connected, by means of the connecting beams 2, an upper yoke 3. Positioned within the frame 1 are the conventional hydraulic pistons 4 and 6, which may be used to raise and lower the right and left-hand press tables 5 and 7, respectively. Connected to the upper yoke 3 are two rail tracks 8 which extend in a horizontal position. Two trolleys 9 and 10 are connected to each other in tandem and may roll by means of track or rail wheels axially along the rails from the position shown in Fig. 1 to the position shown in Fig. 2, and back again. The movement of the cars along the ramp may be effected in the conventional manner, as, for example, by means of an electric drive, or even, for example, manually.

Mounted on the press table 5 is a wet mold pot 12, and mounted on the trolley 10, extending below the same, in normal alignment with the pot 12, is the wet mold 11.

An expression ram 14 is mounted on the press table 7, and, normally mounted thereabove in alignment therewith on the trtolley 9, is the expression mold 13. The movement of the trolleys 9 and 10 on the track 8 is such that the expression mold 13 may be slid past the expression ram 14, and at the same time the wet mold 11 may be slide in position directly above the ram.

The wet mold consists of a screen mold 17, which is a perforate form, having an inner surface substantially corresponding to the outer surface of the molded article to be formed. The screen mold 17 as shown has a cylindrical shape for the formation of a hollow cylindrical article, though a corresponding screen mold may be exchanged for any desired shape. Thus, for example, screen molds having a conical, prismatic, rectangular, square, or dome shape may be used.

Surrounding the outer surface of the screen mold is a fluid-tight chamber 32, which is in sealing engagement with the rim 37 of the opening of the screen mold. Fluid conduits 21 and 22 are in communication with the interior of the chamber 32 to provide for the removal of water during the molding process, and for the introduction of the gas under pressure, as for example, air, in order to facilitate the removal of the wet molding from the screen mold after the same has been formed. The mold pot 12 positioned on the press table 5 below the wet mold 11, has a rim 16, which is so dimensioned that when the press table 5 is raised, the rim will enter into the rim 37 of the screen mold. A feed line 19 for the aqueous pulp extends into the lower portion of the wet mold pot 12. A labyrinth or partition 30 is positioned above the feed line 19, and an air feed line 20 extends into the pot above the labyrinth and terminates below the rim 16. A check valve in the form of a ball check 31 is positioned in the air-feed line 20 to prevent back flow. An annular gasket 18 is positioned in a groove surrounding the rim 16. This gasket is positioned for contact and sealing engagement with the annular ring or flange 36 connected to the lower portion of the wet mold surrounding the opening to the mold screen.

The expression ram 14 mounted on the press table 7 has a perforate mold form 41, which corresponds in shape to the screen mold 17, and which is somewhat smaller in size, so that when the same is inserted in the screen mold 17, its walls will be spaced from the walls of the screen mold 17 at a distance approximately corresponding to the thickness of a wet molding to be produced on the screen mold. The perforate mold form 41 has a limiting ring 39 with a shoulder 40, which contacts the flange 36 when the form 41 has been inserted the correct amount into the screen mold 17. A solid portion 50 extends within the perforate form 41 in supporting contact therewith, so that the form 41 will be supported when the wet molding is pressed. The solid portion 50 has the drainage grooves 50a, through which water passing through the perforate form can run into the trough 51, out through the drain line 52.

Positioned on the trolley 9 above the expression ram 14, the expression mold 13 has a perforate female support form 24, which roughly corresponds in shape to the screen mold 17, but which is somewhat larger than the screen mold and which is tapered outwardly to facilitate insertion of the wet mold and removal of the expressed molding ready for final drying. A flexible bag, such as the rubber bag 23, lines the inner surface of the perforate support 24. A fluid-tight chamber 53 surrounds the outer surface of the form 24, and is connected to the same by means of a common annular base. The flexible rubber bag 23 is sealed to the chamber 53 at the rim of its opening by being pressed between the annular base of the chamber and an annular ring 54. A fluid conduit 55 is in communication with the interior of the chamber 53 to allow the introduction or withdrawal of a pressure fluid. The conduit 55 as shown in Figs. 8 and 9 preferably has a three-way cock 42, a shut-off cock 45, and is connected to the discharge container 43 so as to allow a fluid to be passed into the chamber 53 under pressure, and thus pressing on the bag 23, or to be withdrawn under suction, causing the rubber bag to press firmly against the inner surface of the form 24 in a manner described hereinafter.

In operation, press table 5 is raised by means of a hydraulic piston 4, raising the molding pot 12 in engagement with the wet mold 11, so that these elements are in the position as shown in Fig. 3. The aqueous pulp suspension from which the molded article is to be formed is then introduced through the feed line 19, so that the same slowly rises and fills the pot and the screen mold and deposits a thin, uniform coating of pulp on the inner surface of the screen mold with a very slight pressure differential between the inside and the outside of the mold, thus preventing the penetration of the fibers into and through the screen perforations. Thereafter, the velocity of the pulp feed through the line 19 is substantially increased, building up the thickness of the wet molded article on the inner surface of the screen mold, and forcing a certain quantity of water from the pulp through the screen to the interior of the chamber 32. The labyrinth 30 allows the upward passage of the pulp at the increased pressure and velocity without the formation of eddies, which would cause irregularities in the wall thickness of the article produced. After the desired wall thickness is built up, the excess pulp is moved from the interior of the mold by passing a gaseous pressure medium, such as air, through the air-feed line 20, which quickly forces the excess material out of the mold and additionally forces excess moisture from the wet molded article through the mold screen. The check valve 31 prevents the accumulation of pulp in the air-feed line 20 during the first portion of the operation. Such pulp which would enter the air-feed line subsequent to air discharge, would cause a scoring and pocking of the inner surface of the wet molded article.

The mold screen 17 is so formed that the lower edge of the outlet conduit 21 is lower than the lower edge of the finished wet molding 15, so that the lower edge of the molding is prevented from absorbing additional water and remaining wet. In order to allow a uniform discharge of the water forced through the mold screen 17 and to prevent any currents from forming in the chamber 13, the lower portion of the chamber 13 has discharge slots 33, uniformly distributed over its periphery and leading into the discharge manifold 34, which feeds into the conduit 21. Water thus uniformly runs through these slots 33 into the manifold and out of the conduit 21. Excess gas during the operation may also be removed through the conduit 22. The lower edge of the wet molding 15 is limited by the top of the rim 16 of the wet mold pot. With the rim 16 concentrically fitted within the lower edge 37 of the screen mold, a certain space 35 must occur, due to machining tolerances. Errors in the molding may occur when the molding water penetrates this gap. In order to prevent this, the lower edge of the molding screen 37 is made inperforate. The moldings have a tendency to show a variation in the wall thickness at the rim 16. In order to compensate for this and to allow easy removal of the wet molded article without injury, the mold screen 17 is conically widened at its base, as may best be seen from Fig. 10.

After the formation of the wet molded article in this manner, the press table 5, along with the wet mold 12, is lowered by means of the hydraulic piston 4. The trolleys 9 and 10 are then moved along the rails 8 to the position shown in Fig. 2, so that the wet mold is positioned above in axial alignment with the expression ram 14, as shown in Fig. 4. The press table 7 is then raised by means of the piston 6, so that the expression ram enters into the interior of the screen mold 17 and wet molding 15 with a slight spacing and without mechanically stressing the same. The expression ram in this position is shown in Fig. 2. The line 21 is maintained closed and pressure air is introduced through the line 22, loosening the molding 15 from the screen mold 17 and transferring it to the expression ram 14. The air supply is continued for a further short period of time, while the ram 14 is again lowered to its bottom position by means of a hydraulic piston 6 and press table 7. The trolleys 9 and 10 are then moved along the rails 8 to their original position as shown in Fig. 1. Any fluid under pressure in the chamber 53 has been withdrawn, preferably leaving a small vacuum in the chamber, so that the rubber bag 23 is pressed outwardly firmly against the inner surface of the perforate form 24. The rubber bag in this position may be seen in Figs. 6 and 8. The press table 7 is then hydraulically raised by means of the piston arrangement 6, so that the perforate male form 41 with the wet molding 15 thereon is inserted into the expression mold. No detrimental mechanical influences which could injure the wet molding are exerted on the same in this connection, due to the wide opening and clearance into the interior of the expression mold. The expression mold ram and the wet molding may be seen in this position in Fig. 5.

Pressure is then built up in the chamber 53 by rotating the three-way cock 42 so that the pressure water line 56 is in communication with the portions of the conduit 55 connected to the interior of the chamber 53. Pressure water passed through pressure water line 56 till a pressure in the interior of the chamber 53 is built up to about 6 atmospheres gauge so that the pressure of the rubber bag 23 on the wet molding 15 forces a quantity of water from the wet molding through the perforate male form 41 into the grooves 51 and out of the drain 52. At the same time the wet molding 15 is compressed, reducing its wall thickness, saving energy in the subsequent drying process, and greatly increasing the strength of the final molding.

After the expression process has been completed, the pressure in the chamber 15 is reduced to a relatively low value, as, for example, 0.05 atmosphere gauge, by turning the three-way cock 42 to the position shown in Figs. 8 and 9, so that the pressure water runs back into the container 43 and the small hydrostatic pressure caused by the differences in height between the container 43 and the container 53 presses on the rubber bag 23, causing the same to very gently hold the expressed molding. The press table 7 is then lowered by means of the hydraulic piston 6, so that the expression ram 14 is withdrawn, leaving the expressed molding 15a held by the rubber bag 23 in the expression mold.

At the same time that the expression ram was initially inserted with the wet molding into the expression mold, the wet mold pot was raised in place in engagement with the wet mold, and while the expression was taking place, a new wet molding 15 was being formed in the wet mold in the manner described above. At the same time that the expression ram is withdrawn, the wet mold pot is withdrawn, so that the device reaches starting position for continuous operation, as shown in Fig. 1, with a wet molding 15 in the wet mold and in expressed molding 15a in the expression mold. The trolleys 9 and 10 are then moved to the left along the rail 8 to the position shown in Fig. 2, as the cock 45 is opened to the position shown in Fig. 8, so that the pressure water flows out of the containers 43 and 53, leaving a slight vacuum in the container 53, as, for example, of about 0.2 atmosphere gauge. As a result of this reduction in pressure, the rubber bag 23 is pressed outwardly firmly against the inner surface of the perforate female support form 24, releasing the expressed molding 15a, which drops on the corresponding male receiver 25 from which it can be removed for further processing. During this time, the expression ram has been raised into the interior of the wet mold and is again lowered, removing the wet molding 15. The trolleys 9 and 10 are then moved to the right along the rail 8 to the position shown in Fig. 1, and the operations are repeated, allowing continuous production of the molding. All of the movements of both the trolleys, pistons, and the valves may be automatically controlled in the sequence described above, by means of the well-known hydraulic and electrical control systems, thus allowing the machine to operate completely automatically. The machine may, of course, also be constructed so that in place of the two molds, a multiple number of molds may be positioned alongside each other, so that the capacity of the automatic machine may be substantially increased. The further treatment of the expressed molding 15a as deposited on the male receiver 25 may be effected in various manners. The same may be fed on a drying belt into a drying oven to dry in the conventional manner. This, however, generally results in a shrinking and distortion of the mold part.

In accordance with a preferred embodiment of the invention, the express molding is dried rapidly with a very favorable heat balance, which assures great accuracy of dimension and smoothness of the surface of the molding. This is effected by initially placing the expressed molding 15a on a heated drying ram, which may be positioned in place of the receiver 25 shown in Fig. 2. The heated drying ram is then, along with the expressed molding inserted into a heating, drying die, in which the drying operation is effected.

Figures 12, 13:
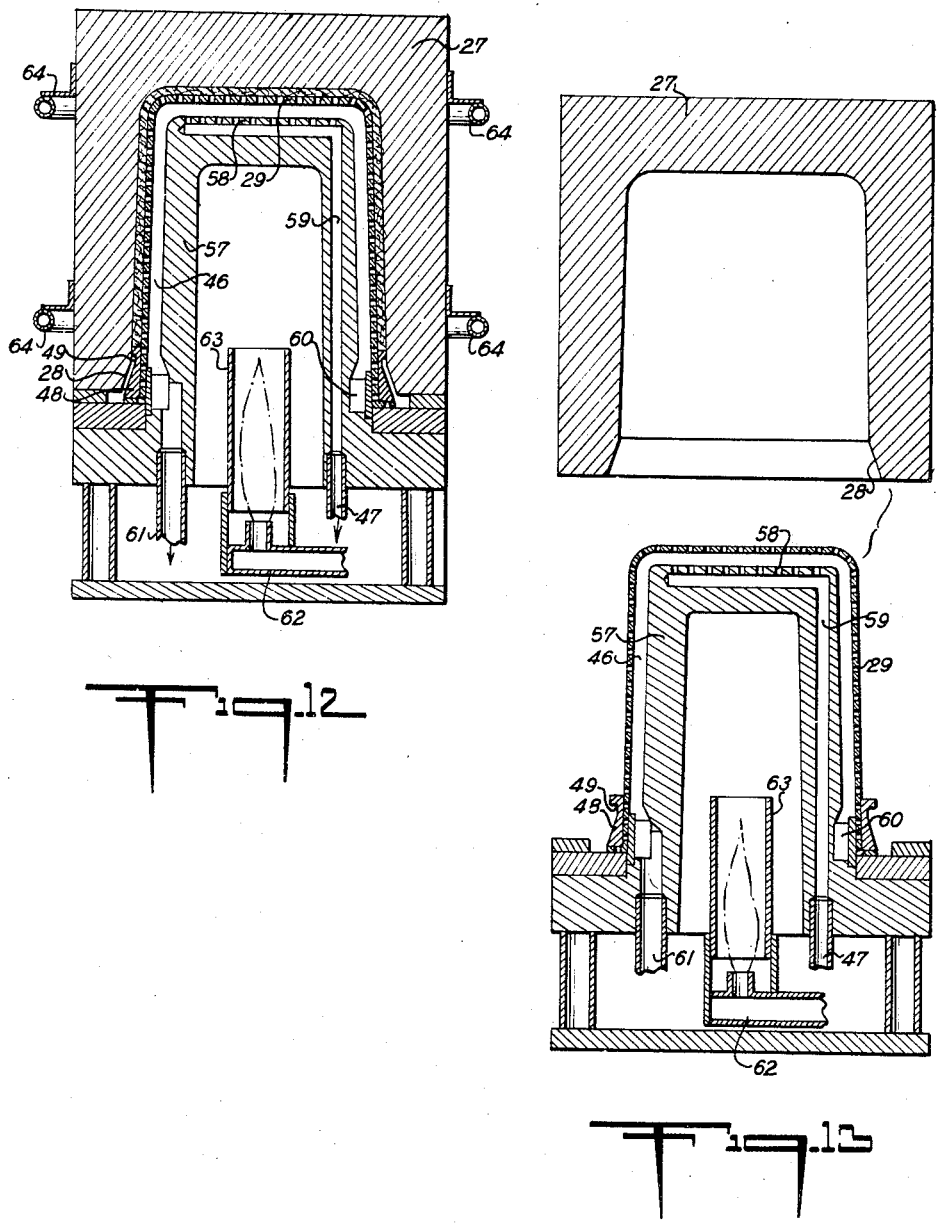
Fig. 12 is a vertical section showing an embodiment of a drying ram in accordance with the invention in position inserted in a drying die.
Fig. 13 is a vertical section showing the drying ram separated from the drying die.

An embodiment of a drying ram and die is shown in Figs. 12 and 13. The drying ram has a perforate male form 29, which corresponds to the inner surface of the finished molding. Positioned within the perforate male form 29 is a corresponding hollow metal form 57, which supports the same and which has the grooves 46. The upper surface of the form 57 is perforate, leading to the compressed air channel 59, to which is connected a pressure air conduit 47. A gas burner 62 extends into the interior of the form 57 and is surrounded by a chimney 63. The grooves 46 lead to the exhaust channel 60 and the exhaust conduit 61.

The die 27 is a solid metal die having a female die surface, which corresponds to the outer surface of the molding to be formed. The die is heated by means of the gas burners 64. The drying ram has a cutting ring 48, the outer diameter of which corresponds to the inner diameter of the die 27, and which at the same time serves as a limiting ring for the dry molding and as a clamping and cutting ring for the lower edge. In order to prevent too great a clamping action, the ring is provided with an undercut 49. The ring 48 also serves to hold the perforate male form 29 in place. The die 27 is tapered at its mouth in order to avoid tearing of the mold parts during depression. This taper should extend at an angle of at least 10° from the vertical.

In operation, the expressed molding 15a is dropped on the drying ram. The drying ram is then moved in position vertically below the drying die 27, and raised, for example, by means of a hydraulic press table, so that the same, with the expressed molding, enters into the drying die. The lower edge of the molding is limited by the cutting rim 48, which is pressed tightly into the die, the mold being thus further compressed to the desired wall thickness and also to its exact shape. The die 27 is heated by means of the gas burner 64, and the ram is heated by means of the gas burner 62. The drying press is maintained closed for the drying period necessary, the length of which depends on the wall thickness of the material. The water vapor liberated escapes through the perforate form 29 into the grooves 46, and is removed through the conduit 61. If desired, a portion of the water vapor may also be removed through passage 57 and conduit 47. After the drying operation is completed, compressed air is passed through the line 47 and the press is opened by lowering the drying ram. The compressed air serves to blow the dry molding off from the perforate male form 29, so that the same remains inside the die, from which it drops down after a short period of time. The drying press may be hooked up to operate automatically with the device producing the expressed molding. Since, however, more than twice as much time is generally necessary for the drying as for the production of the moist expressed molding, generally two or three drying devices are necessary for each device producing the moist expressed molding. The drying press may be operated in synchronization with the device for producing the moist expressed molding, so that a drying ram is in position below the expression mold 24 as the same is in the position shown in Fig. 2 releasing the expressed molding.

While the invention has been described in detail with reference to the specific embodiments shown, various changes and modifications will become apparent to the skilled artisan which fall within the spirit of the invention and the scope of the appended claims.

We claim:

1. Apparatus for the manufacture of molded articles from aqueous pulp, comprising a wet mold including a female screen mold having a substantially fluid-tight chamber surrounding its outer surface in fluid-tight engagement with the rim portion of its opening, a fluid exhaust conduit in communication with the interior of said chamber, an expression mold positioned in fixed spacial relationship alongside and substantially parallel to said wet mold, said expression molds including a perforate female support form having a flexible bag lining its inner surface, a second fluid-tight chamber surrounding its outer surface in fluid-tight engagement with the rim portion of the opening of said flexible bag, and a fluid conduit in communication with the interior of said second chamber, a wet mold pot positioned opposite said wet mold in axial alignment therewith, said wet mold pot including rim means adapted to mate the fluid-tight engagement with the rim of said female screen mold, means for passing an aqueous pulp suspension through said rim means, an expression ram positioned opposite said expression mold in axial alignment therewith, said expression ram including a perforate male ram form adapted to fit within said screen mold and said female support form with its walls in spaced relationship thereto, means for moving said wet mold pot and said wet mold into and out of engagement with each other, means for moving said expression mold and said expression ram into and out of engagement with each other, means for moving said expression mold out of alignment and said wet mold into alignment with said expression ram, means for moving said expression ram and said wet mold into engagement with said ram form in the interior in spaced relationship to said screen mold, means for moving said expression ram and wet mold out of engagement, and means passing a pressure fluid through said fluid conduit into said second fluid-tight chamber.

2. Apparatus according to claim 1, in which said wet mold and expression mold are positioned vertically in alignment above said wet mold pot and expression ram respectively and movable horizontally to position with said wet mold above in vertical alignment with said expression ram and said expression mold to one side of said ram, and in which said means for moving said wet mold and said wet mold pot, said expression mold and said expression ram and said wet mold and expression ram into and out of engagement, are means for independently moving said wet mold pot and said expression ram up and down.

3. Apparatus according to claim 2, in which said wet mold pot and said expression ram are mounted on separate hydraulic press tables positioned side by side, and in which said wet mold and said expression mold are mounted on trolleys movable along a horizontal rail above said press table.

4. Apparatus according to claim 3, including means for in automatic sequence: raising said wet mold pot and said expression ram into engagement with said wet mold and expression mold, respectively, passing an aqueous pulp suspension through said rim means into said wet mold, passing a fluid under pressure into said second chamber, reducing the pressure of the fluid in said second chamber, lowering said wet mold pot and said expression ram, moving said trolley along said rail to the position with said wet mold above said expression ram, raising said expression ram into engagement with said wet mold, withdrawing pressure fluid from said second chamber to produce a reduced pressure therein, lowering said expression ram, moving said trolley along said rail to position with said wet mold above said wet mold pot, and repeating the steps in sequence.

5. Apparatus according to claim 3, which includes means for introducing gas under pressure into said first chamber when said wet mold and said expression ram are in engagement.

6. Apparatus according to claim 1, in which said wet mold pot comprises a substantially closed chamber having said rim means defining openings through its top portion, and in which said means for passing an aqueous pulp suspension through said rim means comprises a conduit for an aqueous pulp suspension leading into the lower portion of the molding pot chamber, and including a labyrinth positioned above said last-mentioned conduit.

7. Apparatus according to claim 6, including an air-feed line extending to said molding pot chamber and terminating below said rim means, and check valve means positioned in said air-feed line.

8. Apparatus according to claim 7, in which the lower rim of said female screen mold is imperforate and dimensioned for the insertion of said rim means therein when said wet mold and mold pot are in engagement with the upper edge of said rim means, limiting the lower edge of a wet molding formed in said female screen mold.

9. Apparatus according to claim 8, in which said first-mentioned fluid-tight chamber has a multiple number of fluid outlet slots defined around the lower edge of its periphery, a fluid outlet manifold surrounding the portion of said first chamber, defining said slots with said fluid exhaust conduit in communication with said manifold, the lower edge of said fluid exhaust conduit being positioned at a lower level than the depth of penetration of said rim means into said screen mold when said wet mold and mold pot are in engagement.

10. Apparatus according to claim 9, in which the portion of said screen mold immediately adjacent said imperforate portion is conically tapered in an outward direction.

11. Apparatus according to claim 10, including a resilient gasket surrounding said rim means and a flange surrounding the rim of said screen mold, said rim and gasket being positioned for fluid-tight engagement when said mold pot is in engagement with said wet mold.

12. Apparatus according to claim 11, including a fluid conduit for passing pressurized gas into said first chamber.

13. Apparatus according to claim 12, in which said expression ram has an imperforate form positioned within in supporting contact to said perforate male ram form, said imperforate form defining drainage grooves between it and said perforate male ram form and an annular drainage slot at its base and including an outlet drain in communication with said drainage slot.

14. Apparatus according to claim 13, in which said expression ram had a limiting rim positioned about the base of said perforate male ram form for limiting its insertion in said wet mold and screen mold.

15. Apparatus according to claim 14, in which said fluid conduit, in communication with the interior of said second chamber, leads to an outlet drain conduit and including a closure valve positioned in said fluid conduit, a three-way valve positioned between said closure valve and said second chamber, a pressure liquid conduit leading into said three-way valve, a discharge container, a conduit connecting said discharge container to said fluid conduit between said closure valve and said three-way valve, and means for adjusting the height of said discharge container with respect to said second chamber.

16. Apparatus according to claim 1, including a male receiving form positioned below said expression mold when said wet mold and expression ram are in alignment.

17. Apparatus according to claim 16, in which said male receiving form is a drying ram having a perforate male ram form, a substantially imperforate hollow form positioned within said perforate form in supporting contact therewith and defining grooves therebetween, an outlet drain in communication with said grooves, means for heating the interior of said imperforate form, and means for passing a gas into said grooves.

18. Apparatus according to claim 17, including a female drying die, means for moving said drying ram and drying die into engagement with said drying ram in the interior of said drying die, and means for heating the outer surface of said drying die.

19. Apparatus according to claim 18, in which the lower rim of said drying die is tapered in an outward direction and in which said drying ram has an undercut cutting rim surrounding the base of said perforate form for insertion into said drying die.

20. Apparatus according to claim 1, in which said fluid conduit, in communication with the interior of said second chamber, leads to an outlet drain conduit and including a closure valve positioned in said fluid conduit, a three-way valve positioned between said closure valve and said second chamber, a pressure liquid conduit leading into said three-way valve, a discharge container, a conduit connecting said discharge container to said fluid conduit between said closure valve and said three-way valve, and means for adjusting the height of said discharge container with respect to said second chamber.

21. Apparatus according to claim 1, in which the lower rim of said perforate female screen mold is imperforate with the perforate portion adjacent thereto being tapered in an outward direction, and in which said first-mentioned chamber has a multiple number of fluid outlet slots defined through its periphery adjacent its base, and including a fluid outlet manifold surrounding the portion of said first chamber defining said slots with said fluid exhaust conduit in communication with said manifold and having its lower edge at a lower level than the upper edge of the imperforate portion of said screen mold.

References Cited in the file of this patent
UNITED STATES PATENTS

| | | |
|---|---|---|
| 1,621,147 | Winnertz | Mar. 15, 1927 |
| 1,717,988 | Low | June 18, 1929 |
| 2,082,409 | Manson | June 1, 1937 |
| 2,222,003 | Sloan | Nov. 19, 1940 |
| 2,234,979 | Randall | Mar. 18, 1941 |